United States Patent [19]

Hesse

[11] Patent Number: 4,503,952
[45] Date of Patent: Mar. 12, 1985

[54] ROTARY SHOCK ABSORBER

[75] Inventor: Hans Hesse, Munich, Fed. Rep. of Germany

[73] Assignee: Krauss-Maffei Aktiengesellschaft, Munich, Fed. Rep. of Germany

[21] Appl. No.: 384,952

[22] Filed: Jun. 4, 1982

[30] Foreign Application Priority Data

Jun. 12, 1981 [DE] Fed. Rep. of Germany ....... 3123344

[51] Int. Cl.³ .................... F16F 9/14; F16F 9/30; F16D 57/02; F16D 65/78
[52] U.S. Cl. .................. 188/306; 188/264 E; 188/268; 188/296; 192/58 B; 280/705; 305/9
[58] Field of Search .......... 188/290, 296, 264 E, 188/322.5, 268, 271, 306, 292; 180/6.7; 280/705; 305/9; 192/58 B; 92/122

[56] References Cited

U.S. PATENT DOCUMENTS

| 1,718,175 | 6/1929 | Nilson | 188/290 |
| 2,661,915 | 12/1953 | O'Conner | 188/306 |
| 2,708,907 | 5/1955 | Shafer | 92/122 |
| 3,179,018 | 4/1965 | Rumsey | 92/122 |
| 3,536,175 | 10/1970 | Kawabe et al. | 192/58 B |
| 4,004,668 | 1/1977 | Blair | 192/58 B |
| 4,098,375 | 7/1978 | Kornylak | 188/268 |
| 4,194,761 | 3/1980 | Falk et al. | 280/705 |
| 4,352,304 | 10/1982 | Warner | 188/290 |

FOREIGN PATENT DOCUMENTS

| 536950 | 10/1950 | Fed. Rep. of Germany . |
| M34803/47a | 4/1961 | Fed. Rep. of Germany . |
| 1555877 | 8/1970 | Fed. Rep. of Germany . |
| 2107326 | 9/1971 | Fed. Rep. of Germany . |
| 2457042 | 7/1975 | Fed. Rep. of Germany . |
| 3002949 | 7/1981 | Fed. Rep. of Germany ... 188/322.5 |
| 3025562 | 11/1982 | Fed. Rep. of Germany . |
| 435036 | 5/1948 | Italy | 188/290 |
| 284824 | 2/1928 | United Kingdom | 188/290 |
| 1482938 | 8/1937 | United Kingdom . |
| 773335 | 10/1980 | U.S.S.R. | 188/292 |

OTHER PUBLICATIONS

Handbook of Fluid Dynamics, Streeter, McGraw Hill Book Company, Inc., New York, 1961, pp. 7.1–7.20.
Von der Zugmaschine zum Leopard 2; Bernard & Graefe Verlag, München, Germany, pp. 241–254.

Primary Examiner—Duane A. Reger
Assistant Examiner—Robert J. Oberleitner
Attorney, Agent, or Firm—Karl F. Ross; Herbert Dubno

[57] ABSTRACT

A rotary shock absorber whose rotor and stator have interfitting annular disks or coaxial cylinders and which receives a dilatant copolymer dispersion. The shock absorber is especially effective for use between a support arm and wheel for the track of a tracked vehicle.

2 Claims, 6 Drawing Figures

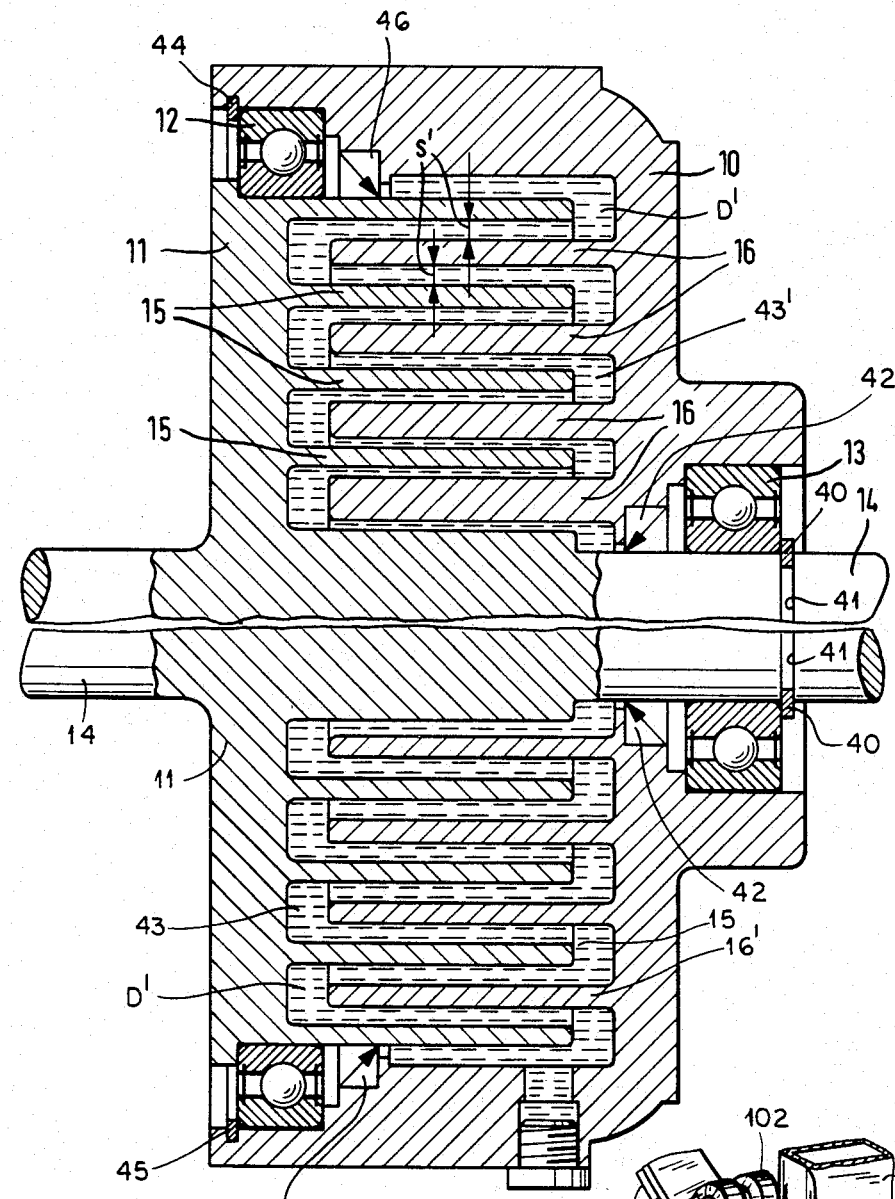
Fig. 2A
PRIOR ART
Fig. 2B
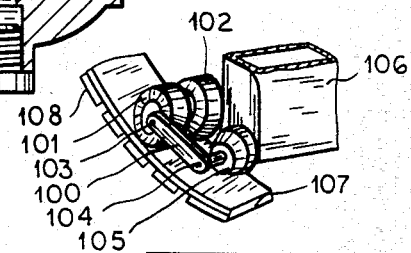
Fig. 3

ROTARY SHOCK ABSORBER

FIELD OF THE INVENTION

My present invention relates to a rotary shock absorber and, more particularly, to a rotary shock absorber which can be used in a wheel suspension and especially between the vehicle chassis and a wheel-support arm of a vehicle, e.g. a track vehicle whose track passes over the wheel.

BACKGROUND OF THE INVENTION

Rotary shock absorbers can be used between any angularly displaceable member and a stationary or supporting member and serve, as do linear shock absorbers, to damp vibration or other kinetic transmission between the two members.

For example, a rotary shock absorber can be used as part of a wheel suspension for a vehicle, especially a track vehicle whose ground-engaging member, e.g. the track, is supported by, guided along or passes around a wheel which is yieldably mounted with respect to the vehicle body or chassis, e.g. on an arm.

The track-supporting arms generally connected to the vehicle chassis or body through the intermediary of rotary shock absorbers, e.g. shock absorbers capable of damping shock or vibration transmission from an angularly displaceable member to a nondisplaceable member.

Conventional rotary shock absorbers (see German open application DE-OS No. 2,457,042) comprise a rotor member which can be connected to the angularly displaceable element and a stator member which can be connected to a relatively stationary element, e.g. a vehicle chassis, and a viscous liquid filling a space defined between these elements and within which vanes may move.

The ends of the vanes may define throttling gaps with the chamber walls so that the rotor in effect forms an inefficient vane-type pump in which relative angular displacement of the rotor and stator is converted to forced displacement of the viscous liquid through throttling gaps and hence into thermal energy.

This bulk displacement principle of shock damping has the disadvantage that the damping effect is dependent in large measure upon critical tolerances of the gap width or flow cross section which cannot be maintained in use and are difficult to establish upon fabrication.

Another disadvantage of this earlier shock absorber construction is that the angular displacement of the rotor is also limited and hence the shock absorber has little versatility and, more specifically, is not amenable to many applications in which a considerable angular stroke is desired between the rotor and the stator.

In another rotary shock absorber (see British Pat. No. 1,484,938) an annular disc is mounted upon a shaft and defines shear gaps with the housing closely surrounding this disc.

A shear gap is a space filled with a liquid, the space being generally sufficiently narrow so that friction between the liquid and the surfaces of the disc and the housing retains certain thicknesses of the liquid against these surfaces so that shear forces are established within the body of liquid, i.e. between the films frictionally adherent to the surfaces and the body of liquid.

The damper of the British patent appears to have utility primarily for weapons systems in which substantial amplitudes of angular displacement are required and must be damped as the weapons system is brought to bear upon a target. Efforts to apply such dampers to vehicle applications and especially to the suspension of track vehicles have proved to be unsuccessful. Apparently, the problem in such application is that the angular velocity in vehicle applications can range from extremely high velocities to extremely low velocities and the shear resistance with extremely low velocities increases markedly and falls sharply with increasing velocities. As a result, the damping effect varies inappropriately.

I have also found that the system of the British patent has the additional disadvantage that it is highly sensitive to tolerances of the type mentioned previously because the maintenance of the narrow shear gap is critical.

OBJECTS OF THE INVENTION

It is the principal object of the present invention to provide an improved rotary shock damper whereby the aforementioned disadvantages of earlier systems can be obviated.

Another object of this invention is to provide a shock damper having a uniform angular displacement which is capable of generating a high damping effect with rapid angular displacement but without critical dependency upon gap tolerances, and wherein, in general, the system can be operated more rapidly and effectively than heretofore.

Still another object of this invention is to provide an improved rotary shock damper which can be fabricated at lower cost and with less concern for dimensional tolerances than has hitherto been the case.

SUMMARY OF THE INVENTION

These objects and others which will become apparent hereinafter are attained, in accordance with the invention, which is based upon my discovery that, by providing a multiplicity of mutually parallel shear gaps and surfaces between the angularly displaceable and nonrotatable members of the rotary shock absorbers, and by utilizing a particular class of fluid, in combination, the disadvantages of the earlier system can be completely obviated in a wholly unexpected manner.

More specifically, the invention provides a rotary shock absorber which comprises a nonrotatable member and a rotatable member defining a plurality of shear gaps between them, each of these shear gaps containing a dilatant viscous copolymer dispersion preferably of the type described in German open application DE-OS No. 3,025,562 and discussed in greater detail below.

This dispersion is characterized by a dilatation flow characteristic.

According to the invention, moreover, the movable member is formed with a plurality of generally parallel annular surfaces juxtaposed with respective generally parallel annular surfaces of the nonrotatable member so that a multiplicity of shear gaps between these surfaces are provided. Surprisingly, when a multiplicity of parallel members projecting from the angularly displaceable bed are provided with mutually parallel but transversely spaced shear gaps and the liquid fills all of these gaps and the gaps are in communication with one another, the dilation liquid eliminates the need for critical observation of gap tolerances while nevertheless providing an intensive shear effect so that rapid angular displacements are met with a greater shear resistance and lower angular velocities with a reduced or zero shear resistance.

The special advantage of this invention is that at extremely low angular velocities, i.e. limited vibration or oscillation velocities as arise when the vehicle is traveling over ground with only minor irregularities or caused by passage of the treads of the track successively around the wheel, no shear resistance is generated and no significant thermal energy is produced in the shock absorber.

Because of the fact that observation of critical gap tolerances is not required, both the rotor and the stator can be formed by injection or die casting or molding and subsequent machining is not necessary.

Furthermore, it is possible to provide the shock absorber of the invention so that it has a fairly limited axial length. In this case, the shock absorber can be provided with a plurality of angularly spaced annular discs preferably unitary with the rotor member and interdigitated with inwardly extending annular discs of the stator, the discs lying in planes perpendicular to the axis.

In another embodiment, intended to have a space-saving configuration in the radial direction, the interfitting member of the rotor and stator can be cylindrical sleeves which are coaxial with one another and are spaced apart by the desired shear gap width.

An important advantage of the latter embodiment is that both the rotor and stator can be fabricated as one-piece elements which can simply be assembled together.

It has been found to be advantageous moreover to increase the gap width with the radial distance of the shear surfaces from the axis, this providing a contribution to the damping effect at high velocities as noted previously.

When the gap width increases radially outwardly, the thickness of the elements of one of the gaps and interfitting elements can be varied accordingly. For example, the thicknesses of the stator cylinders can be progressively decreased outwardly or the thicknesses of the outwardly extending discs of the rotor can decrease outwardly.

BRIEF DESCRIPTION OF THE DRAWING

The above and other objects, features and advantages of the present invention will become more readily apparent from the following description, reference being made to the accompanying drawing in which:

FIGS. 2A and 2B are axial sections of another embodiment of the invention wherein the interfitting elements are cylindrical sleeves; and FIG. 3 is an elevational view of a shock absorber in place according to the invention.

SPECIFIC DESCRIPTION

Figures 1A, 1B:
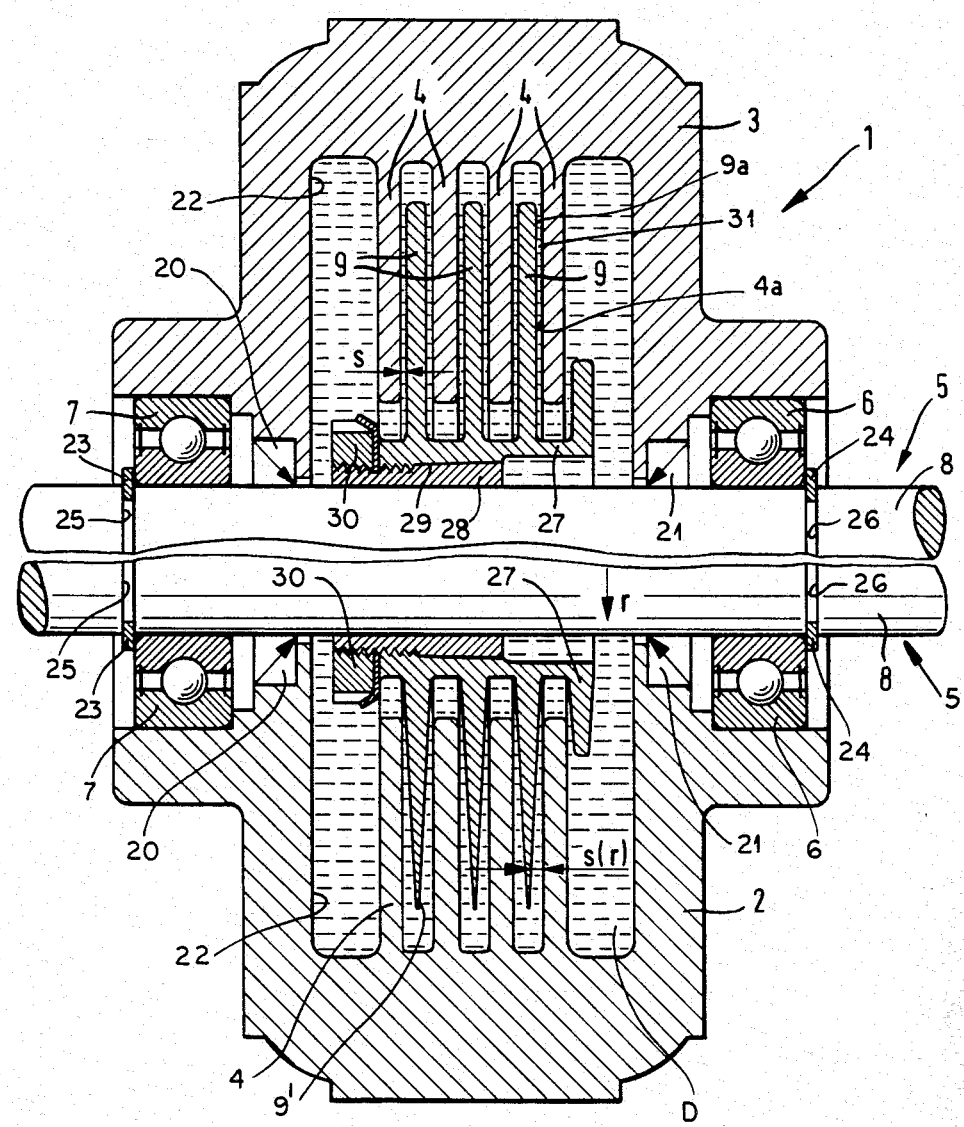
FIGS. 1A and 1B are axial sections through rotor shock absorbers of the present invention showing the interfitting groups of elements as annular discs.

In the following description, reference will be made to a dilatant liquid in the form of a dispersion.

The dilatant liquid is a purely viscous fluid of category I (see chapter 7, pages 4 ff. of Handbook of Fluid Dynamics, Streeter, McGraw-Hill Book Company, New York, 1961), having a logarithmic flow curve in which the shear stress is plotted along the ordinate and the shear rate along the abscissa, whose slope is less than unity. The apparent viscosity of a dilatant liquid increases with increasing shear rate.

The preferred dilatant liquid is a liquid which may be made by the method described in German open application DE-OS No. 3,025,562. The method involves the emulsion copolymerization of 1 to 10% by weight with reference to the total monomer component, of $\alpha,\beta$-monoolefinically unsaturated mono and/or dicarboxylic acids with other monoolefinically unsaturated monomers and up to 5% by weight polyolefinically unsaturated monomers in the presence of emulsifiers, dispersants, polymerization initiators and, if desired, polymerization chain-length regulating substances.

More particularly, the monomers are copolymerized in an aqueous emulsion with the simultaneous agglomeration with only partial fusion of the polymer particles of a particle size range of 5 to 200 nm at a temperature close to the glass temperature of the resulting copolymer.

To the extent necessary (in the event there is insufficient or excess copolymer in the dispersion), the copolymer content of the aqueous dispersion is brought to 35 to 55% by weight and the pH to a value of 3 to 5, or the water in the copolymer dispersion is completely or partially replaced by a water miscible solvent which does not solubilize or swell in the copolymer.

The copolymerizing mixture is preferably provided so that it contains 2 to 10% by weight of the $\alpha,\beta$-monoolefinically unsaturated mono and/or dicarboxylic acids, 0 to 90% by weight of methacrylic esters of alkanols containing 1 to 4 carbon atoms, 0 to 90% by weight of styrene and/or methylmethacrylate, and 0 to 3% by weight of polyolefinically unsaturated monomers. The polymerization is preferably carried out at a temperature of 60° to 95° C. in the presence of 0 to 0.5% by weight of an anionic emulsifier and 0 to 1% by weight (with respect to the quantity of monomers) of a nonionic emulsifier.

As can be seen from FIG. 3, the rotary shock absorber of the present invention can be mounted as indicated at 105 on a portion 106 of a chassis of a tracked vehicle, the shaft 104 extending from the end of the shock absorber being connected to an arm 100 to which a pair of road wheels 101 and 102 are journaled at 103, the vehicle being supported by a number of such wheels on the track 107 whose treads are engaged by the wheels 101 and 102 and pass around idler and other drive wheels over support wheels and between other road wheels and the ground. The housing 105 connected to the chassis corresponds to element 1.

Figure 1C:
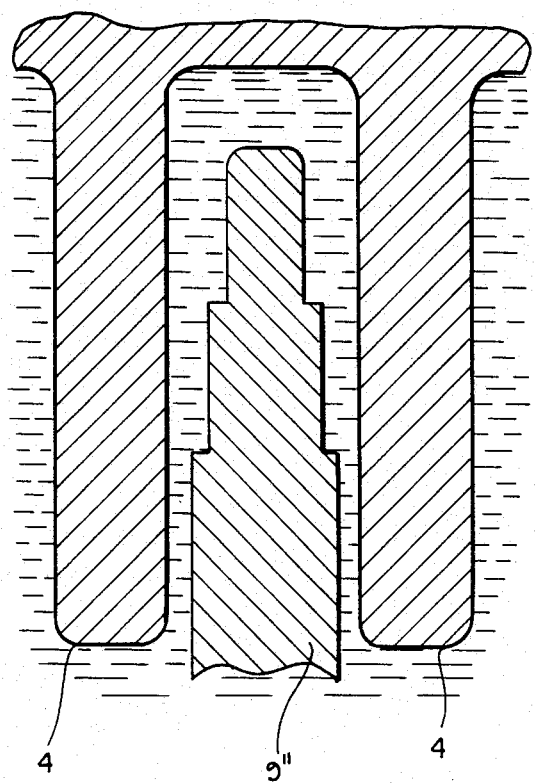
FIG. 1C is a partial sectional view of another embodiment of the invention showing stepped discs.

The shock absorber 105 can represent either the shock absorber of FIG. 1 or the shock absorber of FIG. 2.

The shock absorber of FIG. 1 comprises a housing member 1 which is constituted by a lower housing portion 2 and an upper housing portion 3 bolted together to define the housing which has inwardly extending outer annular disks 4 spaced apart from one another in the axial direction. A pair of seals 20 and 21 close off a chamber 22 within this housing around the shaft 8 which forms part of the angularly displaceable or rotor member 5 of the shock absorber.

The shaft 8 is journaled in the housing 1 on a pair of ball bearings 6 and 7 held in place between split rings 23 and 24 which engage in grooves 25 and 26 of the shaft.

The shaft 8 carries a sleeve 27 which is mounted on the shaft by a complex ring 28 whose tapered surfaces engage the complementary tapered surface of the sleeve 27. A nut 30 is threaded onto the ring 28 to press the sleeve 27 axially to the right and draw the ring 28 to the left and thereby clamp the sleeve 27 onto the shaft.

The sleeve 27 has axially spaced outwardly extending annular disks or plates 9 which are received between the inwardly extending annular disks 4 so that surfaces 4a and 9a are juxtaposed with one another across shear gaps 31 having gap width s.

In the embodiment of FIG. 1A, the lamellae 9 are of uniform thickness radially and hence the width of the gap s is constant over its entire radial and cylindrical extent. However, in the embodiment of FIG. 1B, the radial vanes or disks 9' taper outwardly, i.e. are of progressively diminishing thickness in the radial direction, so the gap width s (r) progressively increases outwardly. The gap therefore widens radially outwardly.

The chamber 22 in both embodiments is filled with a dilatant dispersion D, preferably a copolymer dispersion produced as described in German open application DE-OS 3,025,562 mentioned previously.

This dispersion has the characteristic that, with comparatively slow change in relative displacement between the shock absorber parts 1 and 5 (low velocity vibration or shock) the shear resistance is low or zero which, in the case of an arm supporting a wheel of a track as described, allows a quasi-static motion-following movement without introducing any resistance at the shock absorber or any transfer of force to the chassis from the track through the shock absorber, the spring suspension of conventional design providing the sole force transfer between the track wheel and the chassis.

The same applies for small-amplitude vibration and shock as developed as the wheels ride over the threads or alternately meet the treads and the gaps between them.

At high shock velocity, however, and with large-amplitude displacement of the wheels, considerable force can develop to resist displacement of the movable members within the shock absorber because of the increasing shear resistance.

Apart from the excellent shock damping characteristic of the shock absorber of the instant invention, the copolymer dispersion also possesses excellent thermal characteristics even aside from the good thermal dissipation that is afforded by the shock absorber housing since the heat development is minimal even under high damping activity.

In the embodiments of FIGS. 2A and 2B, which differ only by virtue of the fact that the thicknesses of the axially extending cylindrical members 15 and 16 increase from the radially outermost cylindrical member to the radially innermost cylindrical member in FIG. 2A, the one-piece rotor 11 is formed unitarily with the shaft 14 and is journaled in a bearing 13 held in place by a spring ring 40 in a groove 41 of the shaft 14.

A seal 42 prevents escape of the dilatant dispersion D' filling the chambers 43 and 43' of the unit. A further ball bearing 12 is disposed between the body 11 of the rotor and the housing 10 which is affixed to the chassis of the vehicle. A spring ring 44 in a groove 45 of the housing 10 holds the bearing 12 in place.

A further seal 46 can assist in closing off the chamber 43 or 43'.

The rotor or movable shock absorber member 11 is provided with coaxial cylindrical member 15 which can be of identical thickness or can have thicknesses progressively decreasing radially inwardly just as the thicknesses of the coaxial sleeve 16 progressively increase from sleeve to sleeve in the radially inward direction so that the spacing s' progressively increases radially outwardly. In the embodiment of FIG. 2B, the cylindrical member 16' which interfits with member 15 are all of the same thickness.

In the embodiment in which the thicknesses of the gap between the confronting surfaces of the rotating and stationary members increase radially outwardly, the change in thickness should be sufficient for the increasing peripheral speed radially outwardly.

I claim:

1. A rotary shock absorber comprising:
   a nonrotatable member forming a housing and provided with a plurality of spaced apart annular first elements;
   a rotatable member mounted for angular oscillation and at least partly received in said housing and connectable to a load adapted to transmit shock, said rotatable member being formed with a plurality of annular second elements interfitting with said first elements whereby said members define a chamber within said housing and said first elements are each juxtaposed with a respective second element to define annular shear gaps therewith within said chamber; and
   a body of a dilatant dispersion forming a viscous fluid in said chamber whereby said second elements rotate relatively freely relative to said first elements at low velocity and angular displacement amplitude but high shear resistance develops in said dispersion between said first and second elements at high velocity, the thickness of one of said elements being stepped to increase progressively inwardly whereby the widths of said gaps increase progressively outwardly.

2. The rotary shock absorber defined in claim 1 wherein said first elements are radially spaced coaxial cylinders and said second elements are radially spaced coaxial cylinders.

* * * * *